United States Patent
Sachse

(10) Patent No.: US 8,834,588 B2
(45) Date of Patent: Sep. 16, 2014

(54) POLYCRYSTALLINE AL$_2$O$_3$ BODIES BASED ON MELTED ALUMINUM OXIDE

(75) Inventor: Sebastian Sachse, Villach (AT)

(73) Assignee: Center for Abrasives and Refractories Research & Development C.A.R.R.D. GmbH, Villach (AT)

(*) Notice: Subject to any disclaimer, the term of this patent is extended or adjusted under 35 U.S.C. 154(b) by 167 days.

(21) Appl. No.: 13/641,846

(22) PCT Filed: Aug. 15, 2011

(86) PCT No.: PCT/EP2011/004089
§ 371 (c)(1),
(2), (4) Date: Nov. 16, 2012

(87) PCT Pub. No.: WO2012/041421
PCT Pub. Date: Apr. 5, 2012

(65) Prior Publication Data
US 2013/0086848 A1 Apr. 11, 2013

(30) Foreign Application Priority Data
Oct. 1, 2010 (DE) .......................... 10 2010 047 095

(51) Int. Cl.
*C04B 35/10* (2006.01)
*C01F 7/02* (2006.01)
*C09K 3/14* (2006.01)

(52) U.S. Cl.
CPC ........... *C09K 3/1427* (2013.01); *C01P 2002/60* (2013.01); *C01F 7/027* (2013.01); *C01P 2006/16* (2013.01); *C01P 2006/14* (2013.01)
USPC .................................. 51/307; 51/293; 501/127

(58) Field of Classification Search
CPC ................. C09K 3/1427; C04B 35/10; C04B 2235/3217
See application file for complete search history.

(56) References Cited

U.S. PATENT DOCUMENTS

| 1,192,709 | A | 7/1916 | Tone |
| 1,524,134 | A | 1/1925 | Hutchins |
| 3,646,713 | A | 3/1972 | Marshall et al. |
| 6,613,114 | B1 | 9/2003 | Alary |
| 2005/0150430 | A1 | 7/2005 | Bourlier et al. |
| 2008/0283499 | A1* | 11/2008 | Nakahara et al. ............... 216/67 |

FOREIGN PATENT DOCUMENTS

| CN | 101268014 A | 9/2008 |
| WO | WO 03/084896 A1 | 10/2003 |
| WO | WO 2007/033787 A1 | 3/2007 |
| WO | WO 2012/041421 A1 | 4/2012 |

OTHER PUBLICATIONS

International Search Report and Written Opinion issued Jan. 6, 2012, in International Application No. PCT/EP2011/004089, filed Aug. 15, 2011.
Office Action for corresponding Chinese Patent Application No. 201180011558.4, dated Mar. 4, 2014.

* cited by examiner

*Primary Examiner* — Pegah Parvini
(74) *Attorney, Agent, or Firm* — Finnegan, Henderson, Farabow, Garrett & Dunner, L.L.P.

(57) ABSTRACT

The present invention relates to polycrystalline Al$_2$O$_3$ bodies based on melted aluminum oxide having a mean crystallite size of the primary crystals between 20 μm and 100 μm and a closed macroporosity between 10% by volume and 30% by volume. The polycrystalline Al$_2$O$_3$ bodies may be obtained by tapping out and quenching a liquid aluminum oxide melt and simultaneous seeding of the pouring stream with seed crystals and can be used advantageously for the production of abrasive materials and refractory products.

14 Claims, 4 Drawing Sheets

POLYCRYSTALLINE AL₂O₃ BODIES BASED ON MELTED ALUMINUM OXIDE

Figure 1:
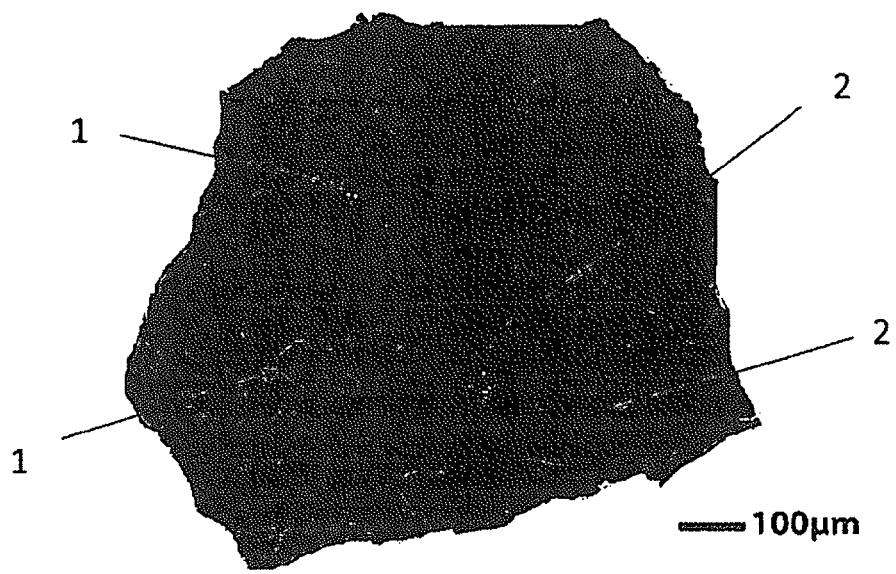

This application is a U.S. national stage entry under 35 U.S.C. §371 from PCT International Application No. PCT/EP2011/004089, filed Aug. 15, 2011, which claims priority to and the benefit of the filing date of DE Application No. 10 2010 047 095.3, filed Oct. 1, 2010, to both of which this application claims the benefit of priority, and the entirety of the subject matter of both of which is incorporated herein by reference.

The present invention relates to polycrystalline $Al_2O_3$ bodies based on melted aluminium oxide having the features of the introductory part of claim 1, to a process for their production and to their use.

$Al_2O_3$ bodies based on melted aluminium oxide are known for their use as abrasive grains for the production of abrasive materials and as starting materials for refractory products. $Al_2O_3$ bodies are obtained by melting aluminium oxide in an electric-arc furnace and subsequent processing of the product obtained via the melt, by fragmentizing and classifying it to a granularity that can then be used for the desired application.

The production of $Al_2O_3$ bodies by melting aluminium oxide in an electric-arc furnace can be carried out by various processes. In the so-called ingot process, the aluminium-oxide-containing raw material is successively melted until the furnace vessel is filled with liquid melt. Then the melting process is interrupted and the melted material is allowed to cool down slowly, during which process corundum ingots with weights of up to 20 t are formed which, after cooling down completely which takes several days, are then crushed and refined into grains. Due to the slow cooling, substantial growth of aluminium oxide crystals up to a diameter of several centimeters takes place in the process, such that after fragmentizing, the refined $Al_2O_3$ bodies which have a diameter preferably in the micrometer and millimeter range, are present as fragments of primary crystals.

Today, however, corundum is mostly produced by means of a casting process in which, after the raw material has melted, the liquid corundum is tapped out from the furnace vessel and the liquid melt can be cooled at different rates, based on the pour rate, the tapped out quantity and the vessels into which the melt is tapped, which is how the crystalline structure of the product is controlled. Thus, by cooling the liquid melt very rapidly, one is able to obtain microcrystalline-structured $Al_2O_3$ bodies that have special mechanical and abrasive properties.

In U.S. Pat. No. 1,192,709 A, electrically melted aluminium oxide is described that is made up of aluminium oxide crystals having a mean diameter between 10 μm and 300 μm and is obtained by pouring into narrow ingot moulds. In the process, the material solidifies to form compact, thin plates that may then be refined into abrasive grains.

In U.S. Pat. No. 1,524,134 A, the production of a fine-crystalline corundum with high porosity is described, wherein the stream of liquid corundum is quenched by a stream of water during tapping, or is poured into a water basin. In the process, a material with high porosity is created, the aluminium oxide crystals of which have a diameter of approximately 130 μm. The product has a porosity of greater than 35%, with a pore diameter between 250 μm and 6 mm. This material is not suitable as abrasive grains for the coarse or intermediate range, but after appropriate refinement may be used as fine abrasive grains or as an additive, for example for floor coverings.

In U.S. Pat. No. 3,646,713 A, a process is described for producing fine-crystalline material, for example based on aluminium oxide, by pouring the melted metal oxide onto a water-cooled rotating roller which together with a second roller forms a narrow gap into which the material is drawn and in the process is cooled down further and compacted. The product is dense and has a crystal structure in which the diameter of the aluminium oxide crystals is between 1 μm and 30 μm.

U.S. Pat. No. 6,613,114 B1 describes abrasive grains made from polycrystalline aluminium oxide that consist of crystals having a diameter of less than 100 μm, the density of which is greater than 97% of the theoretical density of aluminium oxide and the Knoop hardness of which is greater than 2000. In the production of this material, melted aluminium oxide is tapped out at a specified pour rate and the dispersion of the pouring stream into fine, quickly solidifying droplets is assisted by the use of ultrasound. With this process, one is able to obtain dense abrasive aluminium-oxide grains that have a microcrystalline structure.

In summary, it can be stated that by tapping and rapid quenching of liquid aluminium oxide according to the processes described in the prior art, one is able to obtain compact and dense microcrystalline $Al_2O_3$ bodies that are suited for use as abrasive grains. For this purpose, the liquid melt is poured onto cooling rollers, between cooling plates or into ingot moulds, in order to achieve a rapid cooling and solidification of the melted material and thereby prevent crystal growth.

At the same time, repeated attempts have also been made to optimize the quenching of the melted aluminium oxide by blowing compressed air or steam into the pouring stream, during which process, however, as a rule, hollow spheres with diameters of up to approximately 5 mm or greater are formed that, due to their high porosity and low strength, are not or only marginally suited for use as abrasive grains.

Abrasive materials are usually used for surface treatment of metal, wood or ceramics. Depending on the type of material to be treated and the result to be obtained, the abrasive material must satisfy vastly different requirements, which is achieved by varying the abrasive grains used and the structure of the abrasive material. Thus, for example, in an abrasive wheel, depending on the intended use, the grain size, the type of the abrasive grain and binder, the composition and the structure of the abrasive wheel are adjusted and matched to one another. For that purpose the abrasive grains are usually used in the form of compact and dense solids, the abrasive behaviour of which is optimized by a suitable adjustment of the abrasive wheel, for which purpose not only the quantity and type of binder but also additives, for example auxiliary abrasive materials or pore inducers, are varied accordingly.

The pore inducers used are substances that burn off during firing of the wheels after the abrasive wheel has attained sufficient strength, and in the process leave behind pores corresponding to their size. Pore inducers are substances that are suited to introduce pores into an abrasive wheel in a targeted manner, the resulting voids functioning to receive chips and to facilitate the supply of lubricating coolant into the abrasive contact zone. The pore volume of an abrasive wheel is determined by the grain and binder content and is fine-tuned to the respective application by adding the pore inducers. In the ideal case, the lubricating coolant should be used in direct proximity to the abrasive grains during the grinding process, which cannot always be achieved in an ideal manner because of the addition of pore inducers in the bond system.

Because of the large number of different areas of application for abrasives, the abrasive industry is always in search of new abrasive grain types that are optimized for certain fields of application, the use of which will allow the corresponding processes and also the resulting products to be improved.

It is the aim of the present invention to make available a new type of abrasive grain that has advantages over the prior art for certain grinding applications.

This aim is achieved by polycrystalline $Al_2O_3$ bodies based on melted aluminium oxide having the features of claim 1.

It is also an aim of the present invention to make available a corresponding process for producing such $Al_2O_3$ bodies.

This aim is met by a process having the features of claim 5.

Further developments and refinements of the general idea of the invention are the subject of the respective subclaims.

In the course of the present work, it was found that polycrystalline $Al_2O_3$ bodies based on melted aluminium oxide that have a defined closed porosity between 10% by volume and 30% by volume, a content of α-aluminium oxide of greater than 98% by weight and a structure made up of a multitude of $Al_2O_3$ primary crystals with sizes between 20 µm and 100 µm, can be obtained by melting aluminium oxide in an electric-arc furnace, tapping out the liquid aluminium oxide melt at a constant pour rate of less than 80 kg/min, seeding the pouring stream of liquid melt with seed crystals of α- and/or γ-aluminium oxide having a mean grain size ranging from 50 µm to 90 µm, rapid cooling of the melt in order to obtain a solid aluminium oxide body, and subsequent fragmentizing and classification of the solid aluminium oxide body. The polycrystalline $Al_2O_3$ bodies produced in this manner are distinguished by a closed macro-porosity having a pore volume between 10 and 30% by volume, the average diameter of the pores being between 10 µm and 100 µm and the maximum diameter being approximately 120 µm.

In a preferred embodiment of the $Al_2O_3$ bodies, the primary crystals have a size between 30 µm and 60 µm and the content of aluminium oxide is preferably greater than 99.5% by weight.

The shape of the pores corresponds to the structure void between the adjoining and firmly interconnected individual crystals, which preferably have a pseudo-cubic shape. In an advantageous embodiment of the process, the melt is poured at a constant pour rate of less than 40 kg/min. The seeding of the pouring stream can be effected by directly blowing the aluminium oxide crystals into the pouring stream, the quantity of the seed crystals being between 5 and 20% by weight, based on the quantity of tapped out aluminium oxide.

The melt can be cooled in different ways. For instance, the present experiments have shown that the known processes for quenching metal oxide melts, such as for example cooling the melt by means of cooled rollers, pouring it between cooling plates made of metal or pouring it onto cooling plates, can be applied successfully.

In this manner abrasive grains with a defined porosity and a defined crystalline structure can thus be obtained.

In particular when used in abrasive wheels that should have a defined porosity, the use of the abrasive grains according to the invention leads to improvements over the prior art as the additional introduction of pore inducers can now be at least partly dispensed with. When using the abrasive grains according to the invention, the porosity of the abrasive wheel is now formed at least partly by the abrasive grain itself, which brings with it the additional advantage that the lubricating coolant is introduced directly into the abrasive contact zone. Introducing added porosity when using the abrasive grain according to the invention thus improves the cutting capability of the abrasive wheel and assists the stock removal during the work process and additionally, owing to the microcrystalline structure with a large, fissured surface, also improves the integration of the abrasive grain into the abrasive wheel, thereby enabling the abrasive performance to be increased.

Despite the high macro-porosity, the abrasive grain is extremely resilient and can be used also for abrasive applications that are run with high contact pressures.

Even though the polycrystalline $Al_2O_3$ bodies, owing to their structure, are predestined in particular for use in abrasive wheels, they are suited also for use as loose abrasives, in abrasive materials on substrates, or for the production of refractory materials.

Figure 2:
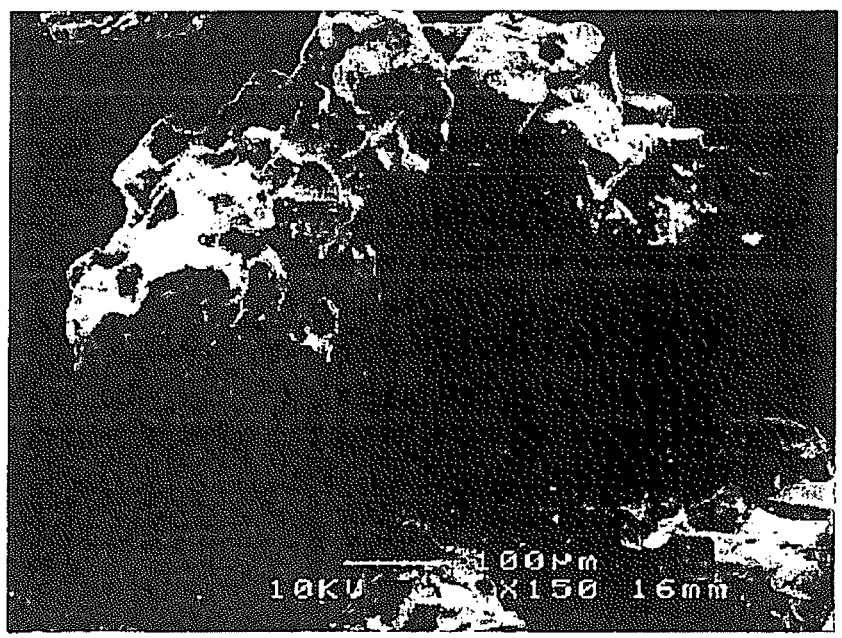
Figure 3:
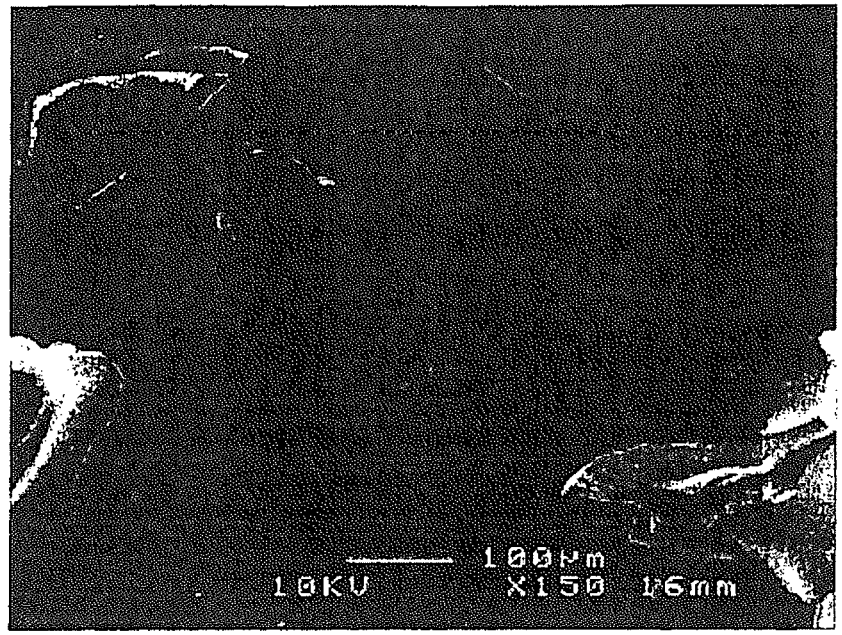
Figure 4:
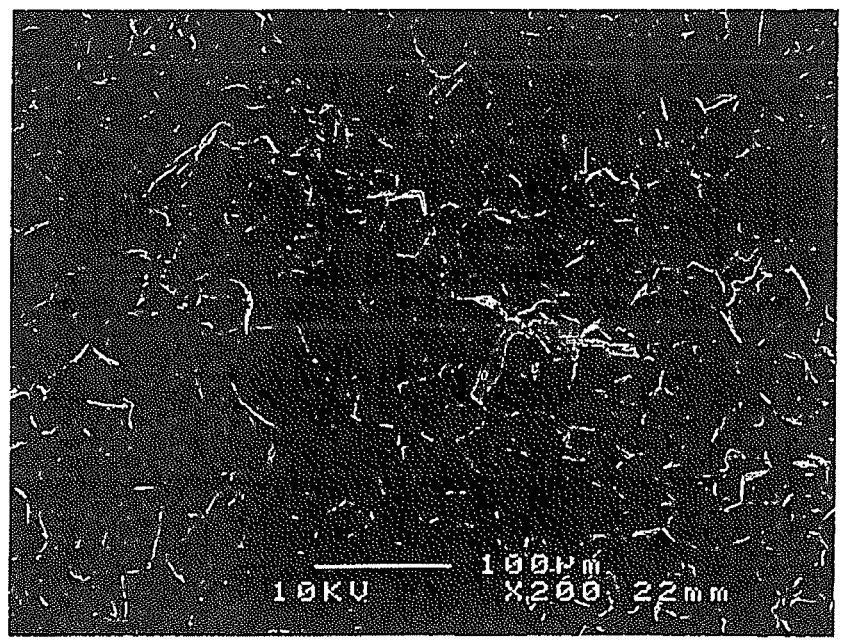
Figure 5:
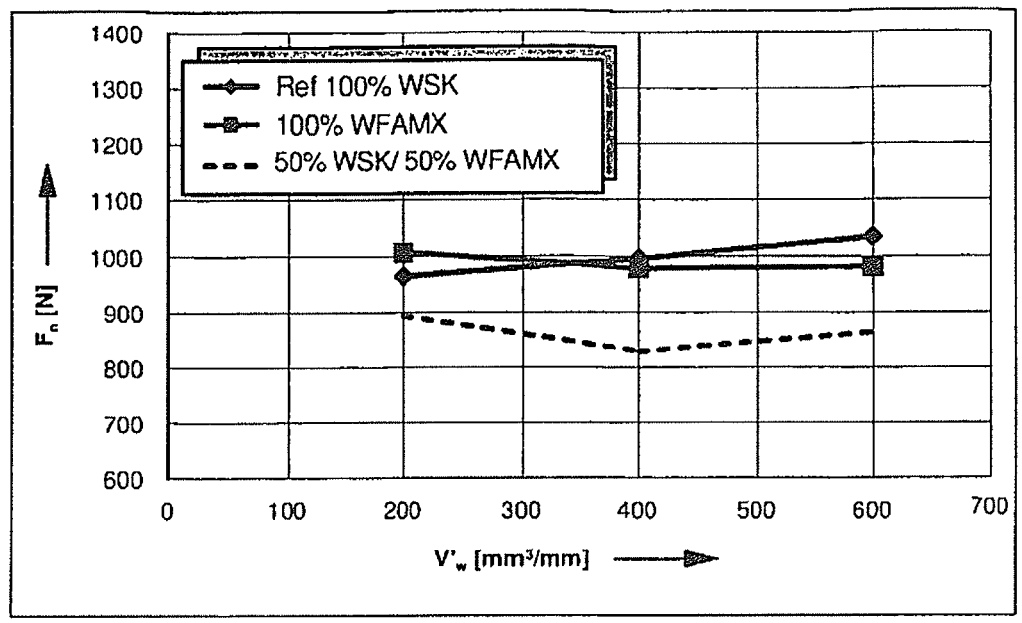
Figure 6:
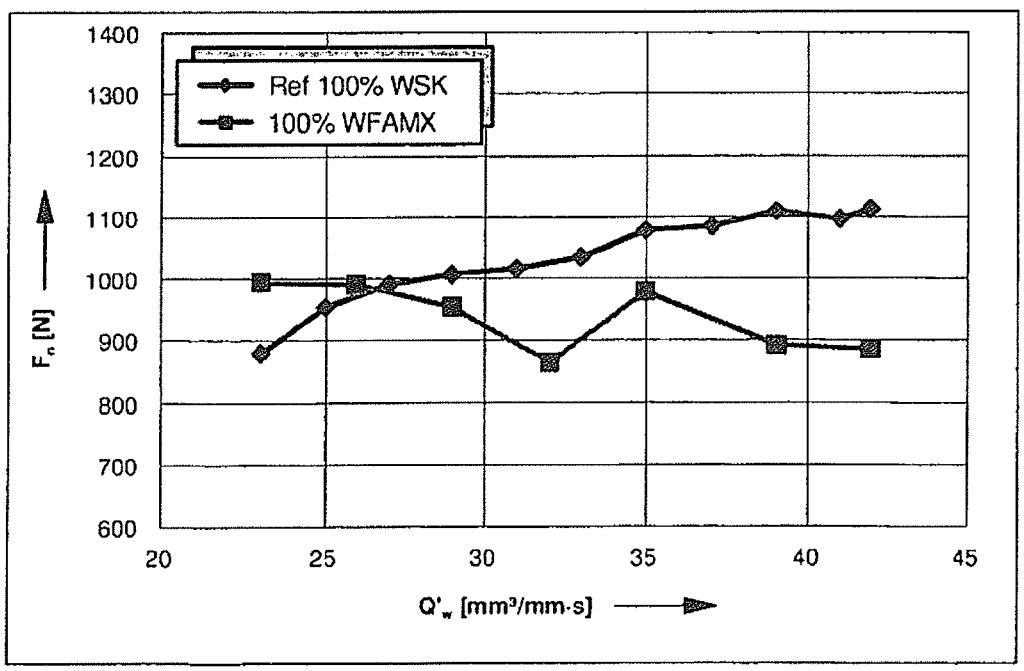
Figure 7:
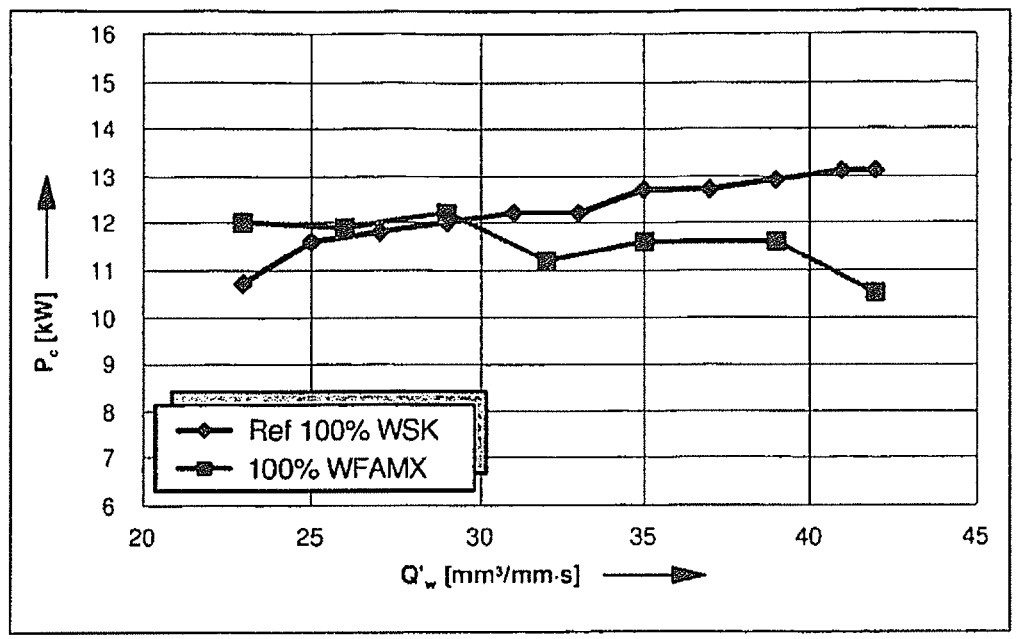
Figure 8:
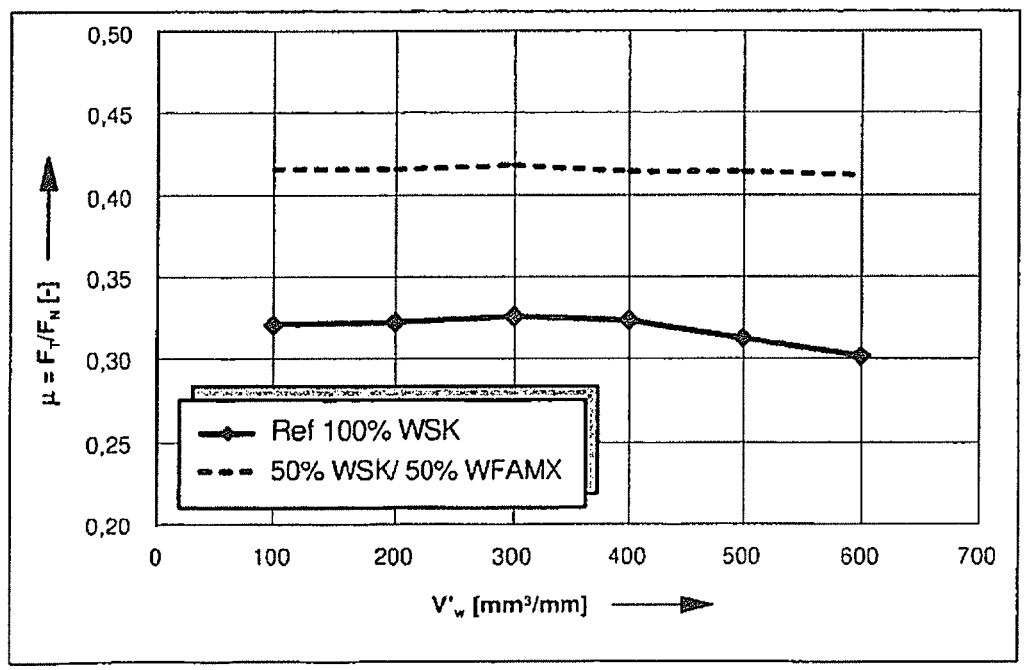

The present invention is explained in detail below, in conjunction with selected examples and figures, in which:

FIG. 1 shows a contrast image of a polished section of a coarse grain,

FIG. 2 shows a scanning electron micrograph of abrasive grains according to the invention at 150-fold magnification, FIG. 3 shows a scanning electron micrograph of an abrasive grain according to the prior art, also at 150-fold magnification, FIG. 4 shows a scanning electron micrograph of a section of a solid aluminium oxide body poured and solidified between cooling rollers, at 200-fold magnification, FIG. 5 shows a graph for an abrasive process, in which the normal force $F_n$ is plotted against the material removal volume $V'_w$, FIG. 6 shows a graph for an abrasive process, in which the normal force $F_n$ is plotted against the material removal rate $Q'_w$, FIG. 7 shows a graph for an abrasive process, in which the spindle power $P_c$ is plotted against the material removal rate $Q'_w$, and FIG. 8 shows a graph for an abrasive process, in which the quotient of the tangential force $F_T$ and normal force $F_n$ is plotted against the material removal volume $V'_w$.

FIG. 1 shows a contrast image of a polished section of a relatively coarse polycrystalline $Al_2O_3$ body having a diameter of approximately 900 µm. The dark areas represent the pores while the light areas represent the individual aluminium-oxide primary crystals. On the basis of such contrast images, the porosity of the abrasive grain can be determined by means of an image analysis, during which the percentage of dark areas to light areas is determined. For the present example, a macro-porosity of 15 to 20% by volume was determined.

FIG. 2 shows a scanning electron micrograph of polycrystalline abrasive grains based on melted aluminium oxide at 150-fold magnification. In the figure it can be seen that the aluminium-oxide primary crystals have a crystal size below 100 µm, the crystalline structure of which is formed as a kind of abrasive-grain agglomerate with macropores arranged between the primary crystals. The shape of the macropores is characterised by the crystal planes of the primary crystals. In spite of the macropores, the primary crystals form a relatively compact association among one another that has a high grain strength.

By way of comparison, FIG. 3 shows a corundum abrasive grain according to the prior art where the liquid corundum was not quenched, but instead was allowed to slowly solidify. This abrasive grain is a fragment of a large primary crystal that was formed when the solidified corundum block was refined into abrasive grains. When one compares FIGS. 2 and 3 to one another, each of which shows abrasive grains of comparable size, the differing structures alone leads one to also expect different abrasive behaviours. While the compact abrasive grain according to the prior art withstands a certain pressure in an abrasive operation and then collapses uncontrolled as soon as this limit is exceeded, in the microcrystalline abrasive grain according to the invention the fracture will occur along the crystal boundaries, during which process then not only new cutting edges are formed but also pores are exposed, thereby furthering the abrasive process as a whole.

FIG. 4 shows a scanning electron micrograph of a section of a quenched corundum flake that was formed by pouring a liquid aluminium oxide melt between water-cooled metal rollers. In this image, the pseudo-cubic crystal shape of the aluminium-oxide primary crystals is visible that is typical for the $Al_2O_3$ bodies according to the invention, with the mean primary crystal size being between 30 μm and 60 μm.

FIGS. 5 to 8 refer to the grinding test described below and will be explained in detail in this context. The grinding tests were carried out on behalf of the applicant at the Institute for Machine Tools and Production Technology (Institut für Werkzeugmaschinen and Fertigungstechnik, IWF) at the technical university Technische Universität Braunschweig in Germany.

EXAMPLE 1

Production of Abrasive Grain F60

For the production of abrasive grain F60, alumina was melted in an electric-arc furnace at a voltage of 100 V. The liquid melt was poured at a pour rate of 30 kg/min onto two counter-rotating water-cooled rollers, with the melt being poured onto the external surface of an internally cooled roller and being drawn with the rotating roller into a gap of approximately 1 mm width formed between the two cooling rollers. While pouring the melt, approximately 10% by weight, based on the poured quantity, of α-$Al_2O_3$ seed crystals having a mean particle diameter of 50 μm were blown into the pouring stream. The quenched polycrystalline plate-shaped material thus obtained was fragmentized in order to obtain polycrystalline $Al_2O_3$ bodies that were then classified by sifting to abrasive grain of FEPA granulation F60, with mean particle size of approximately 260 μm.

For the below-described technical abrasion analysis of the abrasive grain, the abrasive grain thus obtained will be referred to by the type designation WFAMX.

EXAMPLE 2

Grinding Test

Surface Grinding/Creep-Feed Grinding

An abrasive grain F60 obtained according to Example 1 was used to produce ceramically-bonded abrasive wheels, which were then used for surface grinding/creep-feed grinding at high infeed and low cutting speed on the material Inconel 718. For cooling, 5% HYSOL RD (Castrol) was used, with 200 liters of lubricating coolant being used per minute. A standard wheel with a conventional fused corundum (Alodur® WSK F60, Treibacher Schleifmittel GmbH) was compared with a wheel in which 50% of the standard material was replaced with WFAMX F60 (the abrasive grain according to the invention) and with a wheel in which 100% of the standard material was replaced with WFAMX. The normal forces $F_n$ [N] were measured as a function of the material removal volume $V'_w$ [$mm^3$/mm].

The process parameters and the different wheel compositions are listed below:

| | |
|---|---|
| Abrasion process: | surface grinding (creep-feed grinding) |
| Abrasive wheel: | ceramically bonded (hardness H) |
| | Specimen 1: 100% WSK F60 |
| | Specimen 2: 100% WFAMX F60 |
| | Specimen 3: 50% WSK F60/50% WFAMX F60 |
| Material: | Inconel 718 |
| Lubricating coolant: | 200 l/min 5% HYSOL RD (Castrol) |
| Infeed ($a_e$): | 2.0 mm |
| Total infeed ($a_p$): | 15 mm |
| Material removal rate ($Q'_w$): | 20 $mm^3$/mm · s |
| Cutting speed ($V_c$): | 25 m/s |
| Dressing infeed ($a_{ed}$): | 0.015 mm |
| Overlap factor ($U_d$): | 3 |
| Number of dressing cycles (n): | 10 |

The graph shown in FIG. 5 shows the development of the normal force $F_n$ at an increasing material removal volume $V'_w$ for the three different wheels in direct comparison. While a steady increase in the normal force is observed in Specimen 1 (reference), in which 100% standard abrasive grain WSK was used, a slight decline in the normal force at an increasing removal volume $V'_w$ is apparent in Specimen 2, in which the standard grain WSK was replaced with 100% WFAMX, with the normal force $F_n$ dropping to a value below the critical value of 1000 [N] at a material removal volume $V'_w$ of 600 [$mm^3$/mm]. Generally, lower abrasive forces are associated with a higher cutting capability and a cooler cut, with the risk of damage to the workpiece due to temperature-related discolorations being reduced owing to lower temperatures developing during the abrasion process, which is of great importance to the user in precision grinding applications, as temperature-damaged workpieces must be sorted out irreparably as rejects.

Specimen 3, in which a mixture of 50% of the standard material WSK with 50% of the WFAMX abrasive grain according to the invention was used shows a particularly favourable force progression of the normal force $F_n$. The forces developing in the process clearly are below those of Specimens 1 and 2, with the normal force $F_n$ being under 900 [N] even at a material removal volume $V'_w$ of 600 [$mm^3$/mm]. In this case, the risk of grinding burn is significantly reduced while a constant removal rate is maintained, which entails enormous advantages for the user.

EXAMPLE 3

Grinding Test

Surface Grinding/Creep-Feed Grinding (Maximum Load)

As in Example 2, an abrasive grain F60 obtained according to Example 1 was used to produce ceramically-bonded abrasive wheels, which were then used for surface grinding/creep-feed grinding on the material Inconel 718. A standard wheel with conventional fused corundum (Alodur WSK F60, Treibacher Schleifmittel GmbH) was compared with a wheel in which 100% of the standard material was replaced with WFAMX F60. The normal forces $F_n$ [N] at a specified material removal volume $V'_w$ of 100 $mm^3$/mm were measured as a function of the material removal rate $Q'_w$ [$mm^3$/mm·s]. The test was carried out in this case up to the maximum load of the respective abrasive wheels. The maximum load is reached when grinding burn occurs and is signalled by an increase in the grinding noise level (the so-called "rattle").

The process parameters and the different wheel compositions are listed below:

| | |
|---|---|
| Abrasion process: | surface grinding (creep-feed grinding) |
| Abrasive wheel: | ceramically bonded (hardness H) |
| | Specimen 1: 100% WSK F60 |
| | Specimen 2: 100% WFAMX F60 |
| Material: | Inconel 718 |
| Lubricating coolant: | 200 l/min 5% HYSOL RD (Castrol) |
| Infeed ($a_e$): | 1.0 mm |
| Total infeed ($a_p$): | 15 mm |
| Material removal volume ($V'_w$): | 100 mm$^3$/mm |
| Cutting speed ($V_c$): | 25 m/s |
| Dressing infeed ($a_{ed}$): | 0.015 mm |
| Overlap factor ($U_d$): | 3 |
| Number of dressing cycles (n): | 10 |

The results measured in the grinding test are depicted graphically in FIG. 5. In contrast to the previous test (Example 2), the abrasive wheels (Specimen 1, Specimen 2) were tested in this case to their maximum load, during which process the progression of the normal force $F_n$ at an increasing removal rate $Q'_w$ was recorded for a predefined material removal volume $V'_w$ of 100 [mm$^3$/mm]. While the reference wheel with 100% standard grain WSK (Specimen 1) already develops high normal forces that are above 1000 [N] at a material removal rate $Q'_w$ of 30 [mm$^3$/mm·s], the wheel with 100% WFAMX (Specimen 2) shows a relatively high value for the normal force $F_n$ at a low material removal rate $Q'_w$, which then, however—after a short start-up phase, so to speak—drops as the material removal rate $Q'_w$ increases and at a material removal rate $Q'_w$ of 42.5 [mm$^3$/mm·s] is even below 900 [N] and the risk of grinding burn in such an abrasive wheel is low even under high load.

EXAMPLE 4

Grinding Test

Surface Grinding/Creep-Feed Grinding (Maximum Load)

For wheels identical to those in Examples 3 with 100% WSK F60 and WFAMX F60, respectively, under the same conditions, the spindle power $P_c$ [kW] was determined of a specified material removal volume $V'_w$ of 100 [mm$^3$/mm] as a function of the material removal rate $Q'_w$ [mm$^3$/mm·s].

The process parameters and the different wheel compositions are listed below:

| | |
|---|---|
| Abrasion process: | surface grinding (creep-feed grinding) |
| Abrasive wheel: | ceramically bonded (hardness H) |
| | Specimen 1: 100% WSK F60 |
| | Specimen 2: 100% WFAMX F60 |
| Material: | Inconel 718 |
| Lubricating coolant: | 200 l/min 5% HYSOL RD (Castrol) |
| Infeed ($a_e$): | 1.0 mm |
| Total infeed ($a_p$): | 15 mm |
| Material removal volume ($V'_w$): | 100 mm$^3$/mm |
| Cutting speed ($V_c$): | 25 m/s |
| Dressing infeed ($a_{ed}$): | 0.015 mm |
| Overlap factor ($U_d$): | 3 |
| Number of dressing cycles (n): | 10 |

The graph shown in FIG. 7, in which the power consumption of the spindle $P_c$ at an increasing material removal rate $Q'_w$ is shown for the wheels according to Specimen 1 and Specimen 2, confirms the trend already illustrated in Example 4. Thus, the spindle power $P_c$ for the standard wheel with 100% WSK increases continuously, and for a material removal rate $Q'_w$ of 42.5 [mm$^3$/mm·s] reaches a value of over 13 [kW], whereas the spindle of the wheel with 100% WFAMX (abrasive grain according to the invention) under identical conditions at a material removal rate of 42.5 [mm$^3$/mm·s] shows a power consumption of less than 11 [kW].

A low power consumption of the spindle indicates a high cutting capability of the wheel and a cool cut and thus a low susceptibility of the process to grinding burn.

EXAMPLE 5

Grinding Test

Surface Grinding/Creep-Feed Grinding

As in Example 2, an abrasive grain F60 obtained according to Example 1 was used to produce ceramically-bonded abrasive wheels, which were then used for surface grinding/creep-feed grinding on the material Inconel 718. A standard wheel with 100% conventional fused corundum (Alodur® WSK F60, Treibacher Schleifmittel GmbH) was compared with a wheel in which 50% of the standard material was replaced with WFAMX F60. The quotient p of the tangential forces $F_T$ and the normal forces $F_n$ [N] were measured as a function of the material removal volume N', [mm$^3$/mm].

The process parameters and the different wheel compositions are listed below:

| | |
|---|---|
| Abrasion process: | surface grinding (creep-feed grinding) |
| Abrasive disk: | ceramically bonded (hardness H) |
| | Specimen 1: 100% WSK F60 |
| | Specimen 2: 100% WFAMX F60 |
| Material: | Inconel 718 |
| Lubricating coolant: | 200 l/min 5% HYSOL RD (Castrol) |
| Infeed ($a_e$): | 1.0 mm |
| Total infeed ($a_p$): | 15 mm |
| Material removal rate ($Q'_w$): | 20 mm$^3$/mm · s |
| Cutting speed ($V_c$): | 25 m/s |
| Dressing infeed ($a_{ed}$): | 0.015 mm |
| Overlap factor ($U_d$): | 3 |
| Number of dressing cycles (n): | 10 |

In the graph shown in FIG. 8, the quotient p of the tangential force $F_T$ and the normal force $F_n$ was plotted at an increasing material removal volume $V'_w$. The higher this value, the higher the abrasion behaviour of the wheel can be rated, as a rule, because a high quotient μ indicates a small normal force $F_n$. In the present case it can be stated that for Specimen 3 (50% WSK+50% WFAMX), a constant high value is attained which is positively influenced additionally by a relatively high tangential force $F_T$, which, in addition to the high cutting capability and cool cut, gives reason to expect a good profile accuracy of the abrasive wheel.

Even though Examples 1 to 5 refer exclusively to surface grinding/creep-feed grinding (precision grinding) of Inconel 718, this should in no way be seen as limiting. This test series was selected because the advantages of the Al$_2$O$_3$ bodies based on melted aluminium oxide according to the invention as abrasive grains can be illustrated particularly well here. Inconel is a highly sensitive turbine material that was processed with high stock removal rates, and the test series therefore have a high positive significance with regard to the general suitability of the Al$_2$O$_3$ bodies according to the invention as abrasive grains.

By virtue of their fabric and crystal structure and concomitant high strength, the polycrystalline Al$_2$O$_3$ bodies according to the invention can be used advantageously also for other abrasion operations as bonded or loose abrasives and also in abrasives on substrates. Likewise, they are well-suited for use in special refractory products.

The invention claimed is:

1. Polycrystalline $Al_2O_3$ bodies based on melted aluminum oxide having a content of α-aluminum oxide of greater than 98% by weight, made up of a plurality of $Al_2O_3$ primary crystals having a crystallite size between 20 μm and 100 μm characterized in that the $Al_2O_3$ bodies have a closed macroporosity having a pore volume between 10% by volume and 30% by volume, wherein the mean diameter of the pores is between 10 μm and 100 μm and the maximum pore diameter is about 120 μm.

2. The $Al_2O_3$ bodies according to claim 1, characterized in that the primary crystals have a size ranging between 30 μm and 60 μm.

3. The $Al_2O_3$ bodies according to claim 1, characterized in that the content of α-aluminum oxide is greater than 99.5% by weight.

4. The $Al_2O_3$ bodies according to claim 2, characterized in that the content of α-aluminum oxide is greater than 99.5% by weight.

5. The $Al_2O_3$ bodies according to claim 1, characterized in that the primary crystals have a pseudo-cubic crystal shape.

6. The $Al_2O_3$ bodies according to claim 2, characterized in that the primary crystals have a pseudo-cubic crystal shape.

7. The $Al_2O_3$ bodies according to claim 3, characterized in that the primary crystals have a pseudo-cubic crystal shape.

8. A process for the production of polycrystalline $Al_2O_3$ bodies according to claim 1 based on electrically melted aluminum oxide, the process comprising:
   melting aluminum oxide in an electric-arc furnace;
   tapping out the liquid aluminum oxide melt at a constant rate of less than 80 kg/min;
   seeding the pouring stream of the liquid melt with seed crystals of α- and/or γ-aluminum oxide having a mean particle diameter $d_{50}$ of 50 μm to 90 μm;
   cooling of the liquid melt in order to obtain a solid aluminum oxide body; and
   fragmentizing the solid aluminum oxide body in order to obtain the polycrystalline $Al_2O_3$ bodies.

9. The process according to claim 8, characterized in that the melt is tapped out at a constant pour rate of less than 40 kg/min.

10. The process according to claim 8, characterized in that the seeding of the pouring stream occurs by directly blowing the aluminum-oxide seed crystals into the pouring stream.

11. The process according to claim 9, characterized in that the seeding of the pouring stream occurs by directly blowing the aluminum-oxide seed crystals into the pouring stream.

12. The process according to claim 9, characterized in that the quantity of seed crystals is between 5% and 20% by weight, based on the quantity of melted aluminum oxide.

13. The process according to claim 8, characterized in that cooling of the melt is effected by means of water-cooled rollers, by pouring the melt between cooling plates made of metal, or by pouring the melt onto cooling plates.

14. Use of the polycrystalline $Al_2O_3$ bodies according to claim 1 for the production of abrasive and/or fireproof materials.

* * * * *

UNITED STATES PATENT AND TRADEMARK OFFICE
CERTIFICATE OF CORRECTION

| | | |
|---|---|---|
| PATENT NO. | : 8,834,588 B2 | |
| APPLICATION NO. | : 13/641846 | |
| DATED | : September 16, 2014 | |
| INVENTOR(S) | : Sebastian Sachse | |

It is certified that error appears in the above-identified patent and that said Letters Patent is hereby corrected as shown below:

In the Claims

Claim 12, col. 10, line 19, "claim 9" should read -- claim 8 --.

Signed and Sealed this
Thirtieth Day of December, 2014

Michelle K. Lee
*Deputy Director of the United States Patent and Trademark Office*